(12) United States Patent
Liu et al.

(10) Patent No.: US 11,631,166 B2
(45) Date of Patent: Apr. 18, 2023

(54) CROP YIELD PREDICTION METHOD AND SYSTEM BASED ON LOW-ALTITUDE REMOTE SENSING INFORMATION FROM UNMANNED AERIAL VEHICLE

(71) Applicant: Zhejiang University, Hangzhou (CN)

(72) Inventors: Fei Liu, Hangzhou (CN); Wenwen Kong, Hangzhou (CN); Yong He, Hangzhou (CN); Jun Zhou, Hangzhou (CN); Han Guo, Hangzhou (CN); Jiangang Shen, Hangzhou (CN)

(73) Assignee: Zhejiang University, Zhejiang (CN)

( * ) Notice: Subject to any disclaimer, the term of this patent is extended or adjusted under 35 U.S.C. 154(b) by 351 days.

(21) Appl. No.: 17/034,163

(22) Filed: Sep. 28, 2020

(65) Prior Publication Data

US 2021/0358106 A1 Nov. 18, 2021

(30) Foreign Application Priority Data

May 18, 2020 (CN) .......................... 202010417855.X (51) Int. Cl.
| | |
|---|---|
| G06T 7/00 | (2017.01) |
| G06Q 10/0631 | (2023.01) |
| G06Q 50/02 | (2012.01) |
| G06T 11/60 | (2006.01) |

(52) U.S. Cl.
CPC ..... *G06T 7/0004* (2013.01); *G06Q 10/06315* (2013.01); *G06Q 50/02* (2013.01); *G06T 11/60* (2013.01); *G06T 2207/10036* (2013.01); *G06T 2207/30108* (2013.01); *G06T 2207/30188* (2013.01)

(58) Field of Classification Search
CPC ................. G06T 7/0004; G06T 11/60; G06T 2207/10036; G06T 2207/30108; G06T 2207/30188; G06Q 10/06315; G06Q 50/02
USPC ........................................................ 382/103
See application file for complete search history.

*Primary Examiner* — Michael R Neff
(74) *Attorney, Agent, or Firm* — Thomas | Horstemeyer, LLP (57) ABSTRACT

Disclosed a crop yield prediction method and system based on low-altitude remote sensing information from an unmanned aerial vehicle (UAV). Obtaining a plurality of images taken by the UAV; stitching the plurality of images to obtain a stitched image; performing spectral calibration on the stitched image to obtain the reflectivity of each pixel in the stitched image; using a threshold segmentation method to segment the stitched image, to obtain a target area for crop yield prediction; using a Pearson correlation analysis method to analyze a correlation between the reflectivity of each band and the growth status and yield of the crop to obtain feature bands; constructing yield prediction factors based on the feature bands; and determining a predicted crop yield value of the target area for crop yield prediction based on the yield prediction factors and a crop planting area of the target area for crop yield prediction.

9 Claims, 5 Drawing Sheets

CROP YIELD PREDICTION METHOD AND SYSTEM BASED ON LOW-ALTITUDE REMOTE SENSING INFORMATION FROM UNMANNED AERIAL VEHICLE

CROSS-REFERENCE TO RELATED APPLICATIONS

This application claims benefit of and priority to Chinese application no. 202010417855.X, filed May 18, 2020, the entirety of which is incorporated by reference herein.

TECHNICAL FIELD

The present invention relates to the field of yield prediction, and in particular, to a crop yield prediction method and system based on low-altitude remote sensing information from an unmanned aerial vehicle (UAV).

BACKGROUND

Monitoring the planting area and yield of food crops has always been highly valued. Governments and scientific researchers are committed to studying how to timely and accurately learn the information such as the yield of food crops. In addition, the timely acquisition of crop planting information can provide a scientific basis for governments to formulate agricultural production policies, which is essential for ensuring food security. In agricultural production, the timely and accurate prediction of crop yield is also essential for better implementation of crop management, especially in making of input decisions for crop insurance, harvest planning, storage needs, cash flow budget, nutrition, pesticides, and water.

The traditional crop yield prediction methods mainly rely on the farmers' empirical knowledge or large-scale destructive sampling, which have problems of high labor intensity and low prediction accuracy.

SUMMARY

The present invention provides a crop yield prediction method and system based on low-altitude remote sensing information from a UAV, to improve the crop yield prediction accuracy and reduce the labor intensity.

To achieve the above purpose, the present invention provides the following technical solutions:

A crop yield prediction method based on low-altitude remote sensing information from a UAV includes:

obtaining a plurality of images taken by a UAV, where the UAV uses a multi-spectral camera to shoot crop canopies to obtain reflection spectrum images of a plurality of different bands;

stitching the plurality of images to obtain a stitched image, where the stitched image includes a plurality of spectral calibration plates;

performing spectral calibration on the stitched image based on a calibration coefficient of the spectral calibration plate to obtain the reflectivity of each pixel in the stitched image;

using a threshold segmentation method to segment the stitched image based on the reflectivity of each pixel, to obtain a target area for crop yield prediction;

using a Pearson correlation analysis method to analyze a correlation between the reflectivity of each band and the growth status and yield of the crop to obtain feature bands, where the feature bands are a plurality of bands with the highest correlation;

constructing yield prediction factors based on the feature bands; and determining a predicted crop yield value of the target area for crop yield prediction based on the yield prediction factors and a crop planting area of the target area for crop yield prediction.

Optionally, the stitching the plurality of images to obtain a stitched image specifically includes:

obtaining a forward overlap rate and a side overlap rate of the images taken by the UAV, where the forward overlap rate is an overlap rate of two adjacent aerial images taken by the UAV on a same flight strip; and the side overlap rate is an overlap rate of shooting ranges on two adjacent flight strips of the UAV; and performing image stitching on all images based on the forward overlap rate and the side overlap rate, and performing orthophoto correction to obtain the stitched image.

Optionally, the performing spectral calibration on the stitched image based on a calibration coefficient of the spectral calibration plate to obtain the reflectivity of each pixel in the stitched image specifically includes:

obtaining the reflectivity of each spectral calibration plate to obtain a calibration coefficient of each spectral calibration plate;

performing function fitting based on a coordinate point corresponding to each spectral calibration plate to obtain a reflectivity correction function, where an x-coordinate of the coordinate point corresponding to the spectral calibration plate is an average spectral value of all pixels in the spectral calibration plate, a y-coordinate of the coordinate point corresponding to the spectral correction plate is a calibration coefficient of the spectral calibration plate, and the reflectivity correction function is $R=k*DN+b$, where R is the reflectivity of a pixel, DN is a spectral value of the pixel, and k and b are coefficients in the reflectivity correction function; and obtaining the reflectivity of each pixel in the stitched image based on the spectral value of each pixel in the stitched image by using the reflectivity correction function.

Optionally, the constructing yield prediction factors based on the feature bands specifically includes:

obtaining a yield prediction factor model, where the yield prediction factor model is:

$$X_1 = (B_{11} + B_{12}) - 1$$

$$X_2 = (B_{21} - B_{22})$$

$$X_3 = (B_{31} - B_{32})/(B_{31} + B_{32})$$

$$X_4 = (B_{41}/B_{42})$$

$$X_5 = 1.5 * \frac{B_{51} - B_{52}}{B_{51} + B_{52} + 0.5}$$

$$X_6 = \frac{1.16 * (B_{61} - B_{62})}{B_{61} + B_{62} + 0.16}$$

where $X_1$ is a first yield prediction factor model, $B_{11}$ is a spectral value of a first feature band in a first yield prediction factor, and $B_{12}$ is a spectral value of a second feature band in the first yield prediction factor; $X_2$ is a second yield prediction factor model, $B_{21}$ is a spectral value of a first feature band in a second yield prediction factor, and $B_{22}$ is a spectral value of a second feature band in the second yield prediction factor; $X_3$ is a third yield prediction factor model, $B_{31}$ is a spectral value of a first feature band in a third yield prediction factor, and $B_{32}$ is a spectral value of a second feature band in the third yield prediction factor; $X_4$ is a fourth yield prediction factor model, $B_{41}$ is a spectral value of a first feature band in a fourth yield prediction factor, and $B_{42}$ is a spectral value of a second feature band in the fourth yield prediction factor; $X_5$ is a fifth yield prediction factor model, $B_{51}$ is a spectral value of a first feature band in a fifth yield prediction factor, and $B_{52}$ is a spectral value of a second feature band in the fifth yield prediction factor; and $X_6$ is a sixth yield prediction factor model, $B_{61}$ is a spectral value of a first feature band in a sixth yield prediction factor, and $B_{62}$ is a spectral value of a second feature band in the sixth yield prediction factor;

determining all band combinations, where the band combination is a combination of any two of all feature bands; and using a sensitivity analysis method to determine the yield prediction factors, where the yield prediction factors include the first yield prediction factor, the second yield prediction factor, the third yield prediction factor, the fourth yield prediction factor, the fifth yield prediction factor, and the sixth yield prediction factor; a band combination in the first yield prediction factor makes a first correlation coefficient the highest, and the first correlation coefficient is a correlation coefficient between the first yield prediction factor and crop yield; a band combination in the second yield prediction factor makes a second correlation coefficient the highest, and the second correlation coefficient is a correlation coefficient between the second yield prediction factor and crop yield; a band combination in the third yield prediction factor makes a third correlation coefficient the highest, and the third correlation coefficient is a correlation coefficient between the third yield prediction factor and crop yield; a band combination in the fourth yield prediction factor makes a fourth correlation coefficient the highest, and the fourth correlation coefficient is a correlation coefficient between the fourth yield prediction factor and crop yield; a band combination in the fifth yield prediction factor makes a fifth correlation coefficient the highest, and the fifth correlation coefficient is a correlation coefficient between the fifth yield prediction factor and crop yield; and a band combination in the sixth yield prediction factor makes a sixth correlation coefficient the highest, and the sixth correlation coefficient is a correlation coefficient between the sixth yield prediction factor and crop yield.

Optionally, the determining a predicted crop yield value of the target area for crop yield prediction based on the yield prediction factors and a crop planting area of the target area for crop yield prediction specifically includes:

obtaining a unit yield prediction model, where the unit yield prediction model is:

$$M = \alpha * X_1 + \beta * X_2 + \gamma * X_3 + \delta * X_4 + \varepsilon * X_5 + \theta * X_6$$

where $\alpha$, $\beta$, $\gamma$, $\delta$, $\varepsilon$, and $\theta$ are yield prediction coefficients, and M is a predicted value of unit yield; and determining the predicted crop yield value of the target area for crop yield prediction based on the unit yield prediction model and the crop planting area of the target area for crop yield prediction by using a formula $F = M * N$, where N is the crop planting area of the target area for crop yield prediction, and F is the predicted crop yield value in the target area for crop yield prediction.

A crop yield prediction system based on low-altitude remote sensing information from a UAV includes:

an image obtaining module, configured to obtain a plurality of images taken by the UAV, where the UAV uses a multi-spectral camera to shoot crop canopies to obtain reflection spectrum images of a plurality of different bands;

a stitching module, configured to stitch the plurality of images to obtain a stitched image, where the stitched image includes a plurality of spectral calibration plates;

a spectral calibration module, configured to perform spectral calibration on the stitched image based on a calibration coefficient of the spectral calibration plate to obtain the reflectivity of each pixel in the stitched image;

an image segmentation module, configured to use a threshold segmentation method to segment the stitched image based on the reflectivity of each pixel, to obtain a target area for crop yield prediction;

a correlation analysis module, configured to use a Pearson correlation analysis method to analyze a correlation between the reflectivity of each band and the growth status and yield of the crop to obtain feature bands, where the feature bands are a plurality of bands with the highest correlation;

a yield prediction factor construction module, configured to construct yield prediction factors based on the feature bands; and a yield prediction value determining module, configured to determine a predicted crop yield value of the target area for crop yield prediction based on the yield prediction factors and a crop planting area of the target area for crop yield prediction.

Optionally, the stitching module specifically includes:

an aerial image overlap obtaining unit, configured to obtain a forward overlap rate and a side overlap rate of the images taken by the UAV, where the forward overlap rate is an overlap rate of two adjacent aerial images taken by the UAV on a same flight strip; and the side overlap rate is an overlap rate of shooting ranges on two adjacent flight strips of the UAV; and an image stitching unit, configured to perform image stitching on all images based on the forward overlap rate and the side overlap rate, and perform orthophoto correction to obtain the stitched image.

Optionally, the spectral calibration module specifically includes:

a calibration coefficient obtaining unit, configured to obtain the reflectivity of each spectral calibration plate, to obtain a calibration coefficient of each spectral calibration plate;

a reflectivity correction function fitting unit, configured to perform function fitting based on a coordinate point corresponding to each spectral calibration plate to obtain a reflectivity correction function, where an x-coordinate of the coordinate point corresponding to the spectral calibration plate is an average spectral value of all pixels in the spectral calibration plate, a y-coordinate of the coordinate point corresponding to the spectral correction plate is a calibration coefficient of the spectral calibration plate, and the reflectivity correction function is $R = k * DN + b$, where R is the reflectivity of a pixel, DN is a spectral value of the pixel, and k and b are coefficients in the reflectivity correction function; and a reflectivity determining unit, configured to obtain the reflectivity of each pixel in the stitched image based on the spectral value of each pixel in the stitched image by using the reflectivity correction function.

Optionally, the yield prediction factor construction module specifically includes:

a yield prediction factor model obtaining unit, configured to obtain a yield prediction factor model, where the yield prediction factor model is:

$$X_1 = (B_{11} + B_{12}) - 1$$

$$X_2 = (B_{21} - B_{22})$$

$$X_3 = (B_{31} - B_{32})/(B_{31} + B_{32})$$

$$X_4 = (B_{41}/B_{42})$$

$$X_5 = 1.5 * \frac{B_{51} - B_{52}}{B_{51} + B_{52} + 0.5}$$

$$X_6 = \frac{1.16*(B_{61} - B_{62})}{B_{61} + B_{62} + 0.16}$$

where $X_1$ is a first yield prediction factor model, $B_{11}$ is a spectral value of a first feature band in a first yield prediction factor, and $B_{12}$ is a spectral value of a second feature band in the first yield prediction factor; $X_2$ is a second yield prediction factor model, $B_{21}$ is a spectral value of a first feature band in a second yield prediction factor, and $B_{22}$ is a spectral value of a second feature band in the second yield prediction factor; $X_3$ is a third yield prediction factor model, $B_{31}$ is a spectral value of a first feature band in a third yield prediction factor, and $B_{32}$ is a spectral value of a second feature band in the third yield prediction factor; $X_4$ is a fourth yield prediction factor model, $B_{41}$ is a spectral value of a first feature band in a fourth yield prediction factor, and $B_{42}$ is a spectral value of a second feature band in the fourth yield prediction factor; $X_5$ is a fifth yield prediction factor model, $B_{51}$ is a spectral value of a first feature band in a fifth yield prediction factor, and $B_{52}$ is a spectral value of a second feature band in the fifth yield prediction factor; and $X_6$ is a sixth yield prediction factor model, $B_{61}$ is a spectral value of a first feature band in a sixth yield prediction factor, and $B_{62}$ is a spectral value of a second feature band in the sixth yield prediction factor;

a band combination determining unit, configured to determine all band combinations, where the band combination is a combination of any two of all feature bands; and a yield prediction factor determining unit, configured to use a sensitivity analysis method to determine the yield prediction factors, where the yield prediction factors include the first yield prediction factor, the second yield prediction factor, the third yield prediction factor, the fourth yield prediction factor, the fifth yield prediction factor, and the sixth yield prediction factor; a band combination in the first yield prediction factor makes a first correlation coefficient the highest, and the first correlation coefficient is a correlation coefficient between the first yield prediction factor and crop yield; a band combination in the second yield prediction factor makes a second correlation coefficient the highest, and the second correlation coefficient is a correlation coefficient between the second yield prediction factor and crop yield; a band combination in the third yield prediction factor makes a third correlation coefficient the highest, and the third correlation coefficient is a correlation coefficient between the third yield prediction factor and crop yield; a band combination in the fourth yield prediction factor makes a fourth correlation coefficient the highest, and the fourth correlation coefficient is a correlation coefficient between the fourth yield prediction factor and crop yield; a band combination in the fifth yield prediction factor makes a fifth correlation coefficient the highest, and the fifth correlation coefficient is a correlation coefficient between the fifth yield prediction factor and crop yield; and a band combination in the sixth yield prediction factor makes a sixth correlation coefficient the highest, and the sixth correlation coefficient is a correlation coefficient between the sixth yield prediction factor and crop yield.

Optionally, the yield prediction value determining module specifically includes:

a unit yield prediction model obtaining unit, configured to obtain a unit yield prediction model, where the unit yield prediction model is:

$$M = \alpha*X_1 + \beta*X_2 + \gamma*X_3 + \delta*X_4 + \varepsilon*X_5 + \theta*X_6$$

where $\alpha$, $\beta$, $\gamma$, $\delta$, $\varepsilon$, and $\theta$ are yield prediction coefficients, and M is a predicted value of unit yield; and a crop yield prediction unit, configured to determine the predicted crop yield value of the target area for crop yield prediction based on the unit yield prediction model and the crop planting area of the target area for crop yield prediction by using a formula $F=M*N$, where N is the crop planting area of the target area for crop yield prediction, and F is the predicted crop yield value in the target area for crop yield prediction.

According to specific examples provided by the present invention, the present invention discloses the following technical effects.

(1) The labor intensity and operating costs are low, and the operating efficiency is high. Traditional crop yield prediction requires measurement of row spacing and plant spacing, as well as destructive sampling to measure parameters such as the total grains per panicle, seed setting rate, and grain weight to finally calculate the predicted yield per mu, which is labor-intensive, costly, and time-consuming. The present invention uses a UAV to collect crop canopy spectrum image data. With a flying speed of 2.5 m/s, the UAV allows fast estimation of the crop yield in a large area without any personnel entering the paddy field.

(2) The accuracy and stability are high. The traditional crop yield prediction method is highly subjective and mainly depends on the professional knowledge of the operators. The difference in the professional knowledge and experience of the operators leads to different measurement accuracy, making it difficult to maintain the stability and credibility. The equipment of the present invention is stable, and the measurement process is fixed and streamlined, without human impacts. Production verifications show that the accuracy is more than 96% and the stability is more than 98%.

BRIEF DESCRIPTION OF DRAWINGS

To describe the technical solutions in the examples of the present invention or in the prior art more clearly, the following briefly describes the accompanying drawings required for the examples. Apparently, the accompanying drawings in the following description show merely some examples of the present invention, and a person of ordinary skill in the art may still derive other accompanying drawings from these accompanying drawings without creative efforts.

DETAILED DESCRIPTION

The following clearly and completely describes the technical solutions in the examples of the present invention with reference to accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

To make the objectives, features and advantages of the present invention more apparent and comprehensible, the present invention is described in more detail below with reference to the accompanying drawings and specific implementations.

Figure 1:
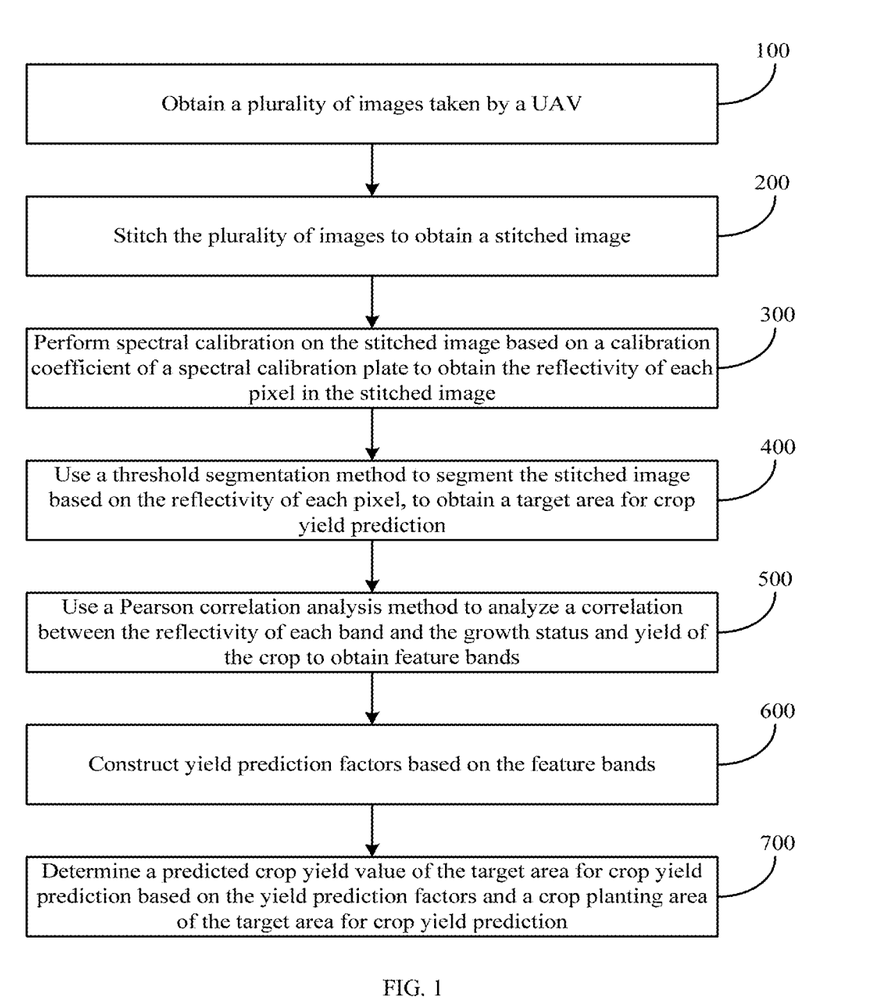
FIG. 1 is a schematic flowchart for a crop yield prediction method based on low-altitude remote sensing information from a UAV.

FIG. 1 is a schematic flowchart for a crop yield prediction method based on low-altitude remote sensing information from a UAV. As shown in FIG. 1, the crop yield prediction method based on low-altitude remote sensing information from a UAV includes the following steps:

Step 100: Obtain a plurality of images taken by the UAV. The UAV uses a multi-spectral camera to shoot crop canopies to obtain reflection spectrum images of a plurality of different bands. Before the information collection through UAV aerial photography, a plurality of spectral calibration plates are placed in unobstructed areas of a target area for crop yield prediction for subsequent spectral correction. Some of the images taken include the spectral calibration plates. The multi-spectral camera is arranged in a heading direction of the UAV and is set to follow yaw mode. During image information collection, a self-stabilizing gimbal of the UAV ensures that the lens direction is perpendicular to the ground. A flight control system of the UAV sends a trigger signal at fixed time intervals. The multi-spectral camera and a position and attitude recorder take photos and collect information. The trigger signal frequency is not greater than 1.5 Hz. The multi-spectral camera captures reflection spectrum information of light in different bands of the crop canopy. The position and attitude recorder obtains GPS geographic location information (longitude and latitude), a pitch angle, a roll angle, and a heading angle of the UAV, altitude, and illuminance information, and then feeds back such data to path planning software of the UAV to further plan a flight path for the UAV.

Step 200: Stitch a plurality of images to obtain a stitched image. Images are stitched according to the same features of forward overlap and side overlap images. Specifically, obtain a forward overlap rate and a side overlap rate of the images taken by the UAV, where the forward overlap rate is an overlap rate of two adjacent aerial images taken by the UAV on a same flight strip; and the side overlap rate is an overlap rate of shooting ranges on two adjacent flight strips of the UAV. Then, perform image stitching on all images based on the forward overlap rate, the side overlap rate, and the same features of adjacent images, and perform ortho-photo correction to obtain the stitched image, where the stitched image includes all spectral calibration plates.

Step 300: Perform spectral correction on the stitched image based on a calibration coefficient of the spectral calibration plate to obtain the reflectivity of each pixel in the stitched image. The calibration coefficient of the spectral calibration plate refers to the reflectivity of each spectral calibration plate. The reflectivity of each spectral calibration plate is known and can be obtained in advance as follows: Measure the reflected light intensity $E_2$ of each spectral calibration plate under standard light of known light intensity $E_1$, then the reflectivity corresponding to each spectral calibration plate is $R_i = E_1/E_2$, which is the calibration coefficient of the spectral calibration plate.

For each spectral calibration plate, an average spectral value of all pixels in the spectral calibration plate is taken as an x-coordinate, and the calibration coefficient is taken as a y-coordinate, to form a coordinate point of the spectral calibration plate. Taking four spectral calibration plates for example, coordinate points corresponding to the four spectral calibration plates can be obtained: $(DN_1, R_1)$ $(DN_2, R_2)$ $(DN_3, R_3)$, and $(DN_4, R_4)$. Linear fitting is performed based on the coordinate points corresponding to all the spectral calibration plates to obtain a reflectivity correction function $R = k*DN + b$ between the spectrum and the reflectivity, where R is the reflectivity of a pixel, DN is a spectral value of the pixel, and k and b are coefficients in the reflectivity correction function.

Further, the reflectivity of each pixel in the stitched image is obtained based on the spectral value of each pixel in the stitched image by using the reflectivity correction function, to complete the spectral calibration.

Step 400: Use a threshold segmentation method to segment the stitched image based on the reflectivity of each pixel, to obtain a target area for crop yield prediction. Based on the reflectivity difference between the target area for crop yield prediction and a non-target crop planting area, the threshold segmentation method is used to remove redundant parts such as roads and ridges on the corrected stitched image, to obtain the accurate target area for crop yield prediction.

Step 500: Use a Pearson correlation analysis method to analyze a correlation between the reflectivity of each band and the growth status and yield of the crop to obtain feature bands, where the feature bands are a plurality of bands with the highest correlation.

Step 600: construct yield prediction factors based on the feature bands. The specific process is as follows.

Obtain a yield prediction factor model, where the yield prediction factor model is:

$$X_1 = (B_{11} + B_{12}) - 1$$

$$X_2 = (B_{21} - B_{22})$$

$$X_3 = (B_{31} - B_{32})/(B_{31} + B_{32})$$

$$X_4 = (B_{41}/B_{42})$$

$$X_5 = 1.5 * \frac{B_{51} - B_{52}}{B_{51} + B_{52} + 0.5}$$

$$X_6 = \frac{1.16 * (B_{61} - B_{62})}{B_{61} + B_{62} + 0.16}$$

where $X_1$ is a first yield prediction factor model, $B_{11}$ is a spectral value of a first feature band in a first yield prediction factor, and $B_{12}$ is a spectral value of a second feature band in the first yield prediction factor; $X_2$ is a second yield prediction factor model, $B_{21}$ is a spectral value of a first feature band in a second yield prediction factor, and $B_{22}$ is a spectral value of a second feature band in the second yield prediction factor; $X_3$ is a third yield prediction factor model, $B_{31}$ is a spectral value of a first feature band in a third yield prediction factor, and $B_{32}$ is a spectral value of a second feature band in the third yield prediction factor; $X_4$ is a fourth yield prediction factor model, $B_{41}$ is a spectral value of a first feature band in a fourth yield prediction factor, and $B_{42}$ is a spectral value of a second feature band in the fourth yield prediction factor; $X_5$ is a fifth yield prediction factor model, $B_{51}$ is a spectral value of a first feature band in a fifth yield prediction factor, and $B_{52}$ is a spectral value of a second feature band in the fifth yield prediction factor; and $X_6$ is a sixth yield prediction factor model, $B_{61}$ is a spectral value of a first feature band in a sixth yield prediction factor, and $B_{62}$ is a spectral value of a second feature band in the sixth yield prediction factor.

Determine all band combinations, where the band combination is a combination of any two of all feature bands.

Use a sensitivity analysis method to determine the yield prediction factors, where the yield prediction factors include the first yield prediction factor, the second yield prediction factor, the third yield prediction factor, the fourth yield prediction factor, the fifth yield prediction factor, and the sixth yield prediction factor; a band combination in the first yield prediction factor makes a first correlation coefficient the highest, and the first correlation coefficient is a correlation coefficient between the first yield prediction factor and crop yield; a band combination in the second yield prediction factor makes a second correlation coefficient the highest, and the second correlation coefficient is a correlation coefficient between the second yield prediction factor and crop yield; a band combination in the third yield prediction factor makes a third correlation coefficient the highest, and the third correlation coefficient is a correlation coefficient between the third yield prediction factor and crop yield; a band combination in the fourth yield prediction factor makes a fourth correlation coefficient the highest, and the fourth correlation coefficient is a correlation coefficient between the fourth yield prediction factor and crop yield; a band combination in the fifth yield prediction factor makes a fifth correlation coefficient the highest, and the fifth correlation coefficient is a correlation coefficient between the fifth yield prediction factor and crop yield; and a band combination in the sixth yield prediction factor makes a sixth correlation coefficient the highest, and the sixth correlation coefficient is a correlation coefficient between the sixth yield prediction factor and crop yield; the first feature bands in different yield prediction factors may be the same or different, and the second feature bands in different yield prediction factors may be the same or different.

Step 700: Determine a predicted crop yield value of the target area for crop yield prediction based on the yield prediction factors and a crop planting area of the target area for crop yield prediction. The specific process is as follows.

Obtain a unit yield prediction model, where the unit yield prediction model is:

$$M=\alpha*X_1+\beta*X_2+\gamma*X_3+\delta*X_4+\varepsilon*X_5+\theta*X_6$$

where $\alpha$, $\beta$, $\gamma$, $\delta$, $\varepsilon$, and $\theta$ are yield prediction coefficients, and M is a predicted value of unit yield. The yield prediction coefficients $\alpha$, $\beta$, $\gamma$, $\delta$, $\varepsilon$, and $\theta$ can be obtained by substituting a known crop yield of a field and yield prediction factors corresponding to the field into the unit yield prediction model of the present invention. In specific examples, the yield prediction coefficients can be determined in other ways.

Determine the predicted crop yield value of the target area for crop yield prediction based on the unit yield prediction model and the crop planting area of the target area for crop yield prediction by using a formula F=M*N, where N is the crop planting area of the target area for crop yield prediction, and F is the predicted crop yield value in the target area for crop yield prediction.

Figure 2:
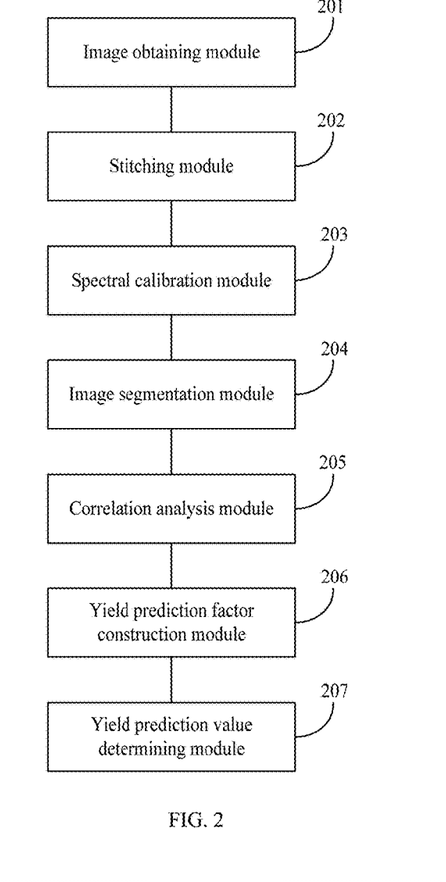
FIG. 2 is a schematic structural diagram of a crop yield prediction system based on low-altitude remote sensing information from a UAV.

FIG. 2 is a schematic structural diagram of a crop yield prediction system based on low-altitude remote sensing information from a UAV. As shown in FIG. 2, the crop yield prediction system based on low-altitude remote sensing information from a UAV includes:

an image obtaining module 201, configured to obtain a plurality of images taken by the UAV, where the UAV uses a multi-spectral camera to shoot crop canopies to obtain reflection spectrum images of a plurality of different bands;

a stitching module 202, configured to stitch the plurality of images to obtain a stitched image, where the stitched image includes a plurality of spectral calibration plates;

a spectral calibration module 203, configured to perform spectral calibration on the stitched image based on a calibration coefficient of the spectral calibration plate to obtain the reflectivity of each pixel in the stitched image;

an image segmentation module 204, configured to use a threshold segmentation method to segment the stitched image based on the reflectivity of each pixel, to obtain a target area for crop yield prediction;

a correlation analysis module 205, configured to use a Pearson correlation analysis method to analyze a correlation between the reflectivity of each band and the growth status and yield of the crop to obtain feature bands, where the feature bands are a plurality of bands with the highest correlation;

a yield prediction factor construction module 206, configured to construct yield prediction factors based on the feature bands; and a yield prediction value determining module 207, configured to determine a predicted crop yield value of the target area for crop yield prediction based on the yield prediction factors and a crop planting area of the target area for crop yield prediction.

In another example, in the crop yield prediction system based on low-altitude remote sensing information from a UAV according to the present invention, the stitching module 202 specifically includes:

an aerial image overlap obtaining unit, configured to obtain a forward overlap rate and a side overlap rate of the images taken by the UAV, where the forward overlap rate is an overlap rate of two adjacent aerial images taken by the UAV on a same flight strip; and the side overlap rate is an overlap rate of shooting ranges on two adjacent flight strips of the UAV; and an image stitching unit, configured to perform image stitching on all images based on the forward overlap rate and the side overlap rate, and perform orthophoto correction to obtain the stitched image.

In another example, in the crop yield prediction system based on low-altitude remote sensing information from a UAV according to the present invention, the spectral calibration module 203 specifically includes:

a calibration coefficient obtaining unit, configured to obtain the reflectivity of each spectral calibration plate to obtain a calibration coefficient of each spectral calibration plate;

a reflectivity correction function fitting unit, configured to perform function fitting based on a coordinate point corresponding to each spectral calibration plate to obtain a reflectivity correction function, where an x-coordinate of the coordinate point corresponding to the spectral calibration plate is an average spectral value of all pixels in the spectral calibration plate, a y-coordinate of the coordinate point corresponding to the spectral correction plate is a calibration coefficient of the spectral calibration plate, and the reflectivity correction function is R=k*DN+b, where R is the reflectivity of a pixel, DN is a spectral value of the pixel, and k and b are coefficients in the reflectivity correction function; and a reflectivity determining unit, configured to obtain the reflectivity of each pixel in the stitched image based on the spectral value of each pixel in the stitched image by using the reflectivity correction function.

In another example, in the crop yield prediction system based on low-altitude remote sensing information from a UAV according to the present invention, the yield prediction factor construction module 206 specifically includes:

a yield prediction factor model obtaining unit, configured to obtain a yield prediction factor model, where the yield prediction factor model is:

$$X_1 = (B_{11} + B_{12}) - 1$$

$$X_2 = (B_{21} - B_{22})$$

$$X_3 = (B_{31} - B_{32})/(B_{31} + B_{32})$$

$$X_4 = (B_{41}/B_{42})$$

$$X_5 = 1.5 * \frac{B_{51} - B_{52}}{B_{51} + B_{52} + 0.5}$$

$$X_6 = \frac{1.16 * (B_{61} - B_{62})}{B_{61} + B_{62} + 0.16}$$

where $X_1$ is a first yield prediction factor model, $B_{11}$ is a spectral value of a first feature band in a first yield prediction factor, and $B_{12}$ is a spectral value of a second feature band in the first yield prediction factor; $X_2$ is a second yield prediction factor model, $B_{21}$ is a spectral value of a first feature band in a second yield prediction factor, and $B_{22}$ is a spectral value of a second feature band in the second yield prediction factor; $X_3$ is a third yield prediction factor model, $B_{31}$ is a spectral value of a first feature band in a third yield prediction factor, and $B_{32}$ is a spectral value of a second feature band in the third yield prediction factor; $X_4$ is a fourth yield prediction factor model, $B_{41}$ is a spectral value of a first feature band in a fourth yield prediction factor, and $B_{42}$ is a spectral value of a second feature band in the fourth yield prediction factor; $X_5$ is a fifth yield prediction factor model, $B_{51}$ is a spectral value of a first feature band in a fifth yield prediction factor, and $B_{52}$ is a spectral value of a second feature band in the fifth yield prediction factor; and $X_6$ is a sixth yield prediction factor model, $B_{61}$ is a spectral value of a first feature band in a sixth yield prediction factor, and $B_{62}$ is a spectral value of a second feature band in the sixth yield prediction factor;

a band combination determining unit, configured to determine all band combinations, where the band combination is a combination of any two of all feature bands; and a yield prediction factor determining unit, configured to use a sensitivity analysis method to determine the yield prediction factors, where the yield prediction factors include the first yield prediction factor, the second yield prediction factor, the third yield prediction factor, the fourth yield prediction factor, the fifth yield prediction factor, and the sixth yield prediction factor; a band combination in the first yield prediction factor makes a first correlation coefficient the highest, and the first correlation coefficient is a correlation coefficient between the first yield prediction factor and crop yield; a band combination in the second yield prediction factor makes a second correlation coefficient the highest, and the second correlation coefficient is a correlation coefficient between the second yield prediction factor and crop yield; a band combination in the third yield prediction factor makes a third correlation coefficient the highest, and the third correlation coefficient is a correlation coefficient between the third yield prediction factor and crop yield; a band combination in the fourth yield prediction factor makes a fourth correlation coefficient the highest, and the fourth correlation coefficient is a correlation coefficient between the fourth yield prediction factor and crop yield; a band combination in the fifth yield prediction factor makes a fifth correlation coefficient the highest, and the fifth correlation coefficient is a correlation coefficient between the fifth yield prediction factor and crop yield; and a band combination in the sixth yield prediction factor makes a sixth correlation coefficient the highest, and the sixth correlation coefficient is a correlation coefficient between the sixth yield prediction factor and crop yield.

In another example, in the crop yield prediction system based on low-altitude remote sensing information from a UAV according to the present invention, the yield prediction value determining module 207 specifically includes:

a unit yield prediction model obtaining unit, configured to obtain a unit yield prediction model, where the unit yield prediction model is:

$$M=\alpha*X_1+\beta*X_2+\gamma*X_3+\delta*X_4+\varepsilon*X_5+\theta*X_6$$

where $\alpha$, $\beta$, $\gamma$, $\delta$, $\varepsilon$, and $\theta$ are yield prediction coefficients, and M is a predicted value of unit yield; and a crop yield prediction unit, configured to determine the predicted crop yield value of the target area for crop yield prediction based on the unit yield prediction model and the crop planting area of the target area for crop yield prediction by using a formula F=M*N, where N is the crop planting area of the target area for crop yield prediction, and F is the predicted crop yield value in the target area for crop yield prediction.

The following further describes the solution of the present invention in combination with a specific example.

Figure 3:
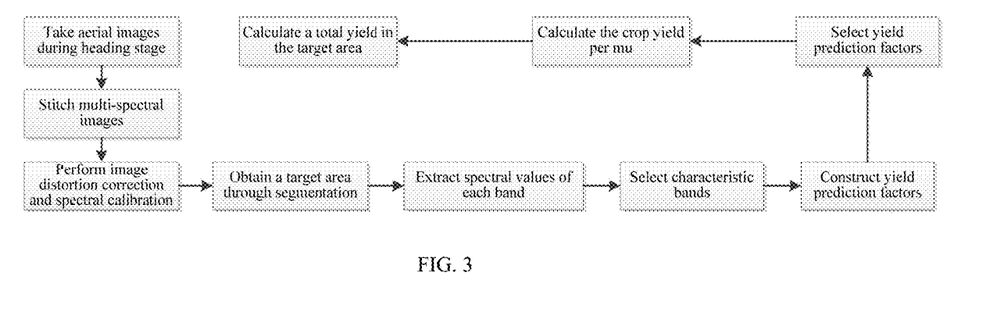
FIG. 3 is a schematic flowchart of a specific example of the present invention.

FIG. 3 is a schematic flowchart of a specific example of the present invention. As shown in FIG. 3, the example includes the following steps:

Step 1: Place four standard spectral calibration plates in a target area for crop yield prediction.

Step 2: At the initial stage of crop heading, use a UAV with a multi-spectral imaging system for aerial photography to collect crop multi-spectral image information.

Step 3: Complete multi-spectral image stitching based on image features.

Step 4: Perform image distortion correction and spectral calibration processing on an obtained image.

Step 5: Segment the image to obtain the target area for crop yield prediction.

Step 6: Extract a spectral value of each band in the target area.

Step 7: Select spectral values in a band range of 611 nm to 870 nm based on a correlation between the spectral value of each band of the crop canopy and the growth status and yield of the crop.

Step 8: Construct yield prediction factors by using an algorithm for calculating the spectral values of each band determined based on a feature band.

Step 9: Select a feature yield prediction factor through sensitivity analysis.

Step 10: Substitute the yield prediction factor into a crop yield prediction formula, to calculate the crop yield per mu in the target area for crop yield prediction.

Step 11: Calculate a total yield based on a crop planting area and the predicted crop yield per mu in the target area.

Figure 4:
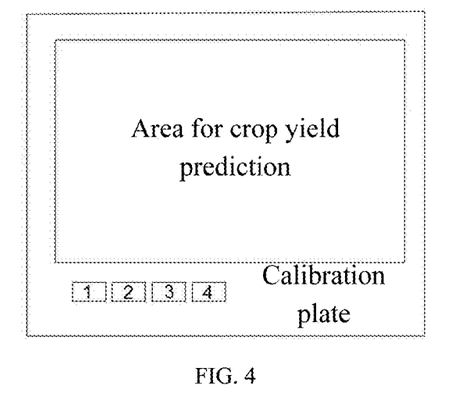
FIG. 4 is a schematic position diagram of calibration plates according to a specific example of the present invention.

FIG. 4 is a schematic position diagram of calibration plates according to a specific example of the present invention. As shown in FIG. 2, under the sunny and cloudless conditions, four spectral calibration plates and one calibration cloth are placed near the target crop field. In this example, the SH-8-px-RS-02 eight-rotor UAV and UAV gimbal designed and produced by Zhejiang University are equipped with an RGB camera and a 25-band multi-spectral camera to collect crop field images and spectral information. The flying height of the UAV is set to 25 meters, the flying speed is 2.5 m/s, and the shooting angle is always vertically downward, covering the entire crop test area.

Figure 5:
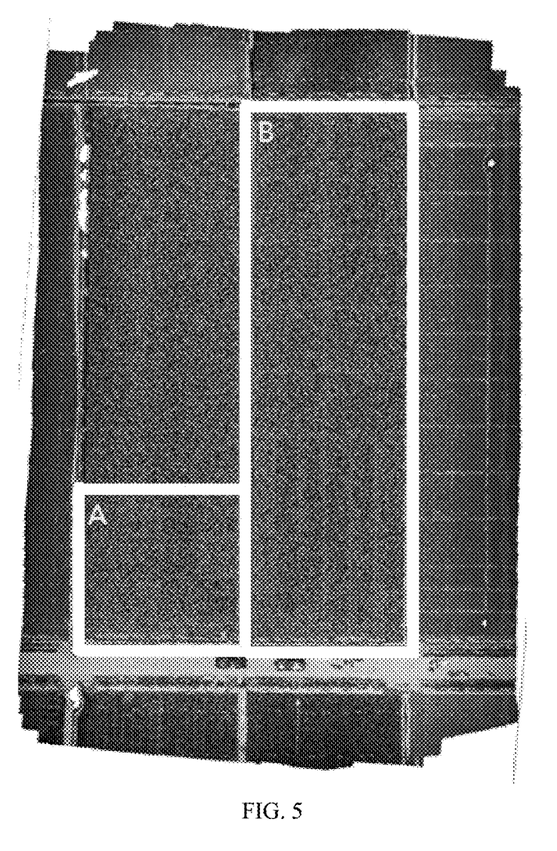
FIG. 5 is an aerial image according to a specific example of the present invention.

The multi-spectral camera is arranged in a heading direction of the UAV and is set to follow yaw mode, a forward overlap rate is set to 60%, and a side overlap rate is set to 55%. During image information collection, the self-stabilizing gimbal ensures that the lens direction is perpendicular to the ground. A flight control system of the UAV sends a trigger signal at a fixed time interval of 0.91 s. The multi-spectral camera and a position and attitude recorder take photos and collect information. FIG. 5 is an aerial image according to the specific example of the present invention.

Then, based on the same features of the forward overlap and side overlap images, image stitching is performed by using stitching software, and image spectrum calibration is performed by using the four calibration plates and a calibration coefficient. The corrected multi-spectral image is segmented based on different spectral values of the target area for crop yield prediction and a surrounding area to remove unnecessary parts such as roads and ridges to obtain an accurate target area for crop yield prediction. Disturbing multi-spectral information such as soil and water in the field is removed by using a soil background removal algorithm, to further extract a spectral value of each pixel in the target area for crop yield prediction, as well as the overall maximum, minimum, and average values of each band.

Figure 6:
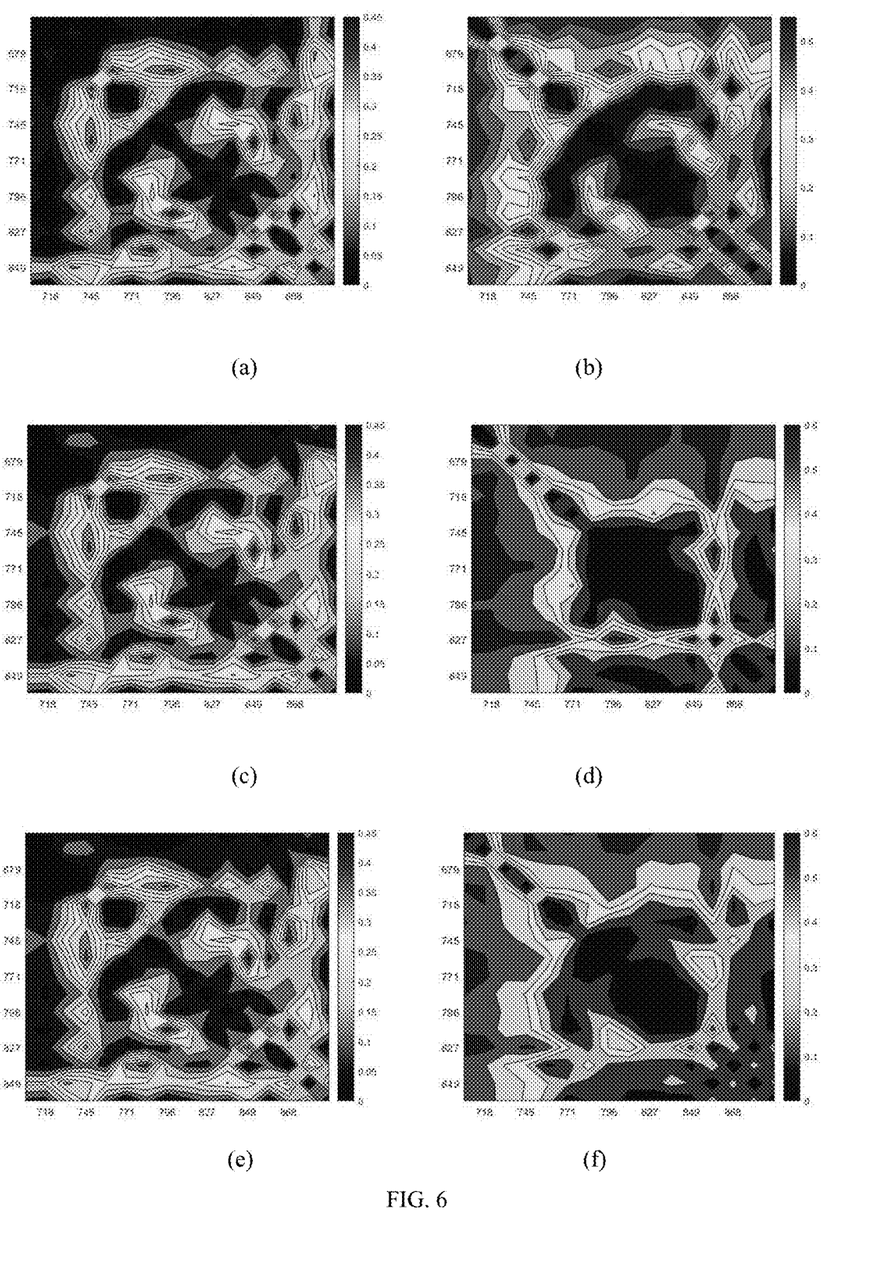
FIG. 6 shows correlation coefficients of yield prediction factors corresponding to different band combinations according to a specific example of the present invention.

The feature bands are selected based on the correlation between the spectral value of each band of the crop canopy and the growth status and yield of the crop. Table 1 shows a correlation between the bands and yields.

each yield prediction factor $X_n$ (n=1, 2, 3, 4, 5, 6) has 576 (24*24) band combinations. To find a band combination with the highest correlation coefficient between the yield prediction factor and the crop yield, sensitivity analysis (existing method) is used to select the first feature band and the second feature band corresponding to each yield prediction factor. FIG. 6 shows correlation coefficients of yield prediction factors corresponding to different band combinations according to a specific example of the present invention. As shown in FIG. 6, (a) shows a correlation coefficient between yield prediction factor $X_1$ and the yield; (b) shows a correlation coefficient between yield prediction factor $X_2$ and the yield; (c) shows a correlation coefficient between yield prediction factor $X_3$ and the yield; (d) shows a correlation coefficient between yield prediction factor $X_4$ and the yield; (e) shows a correlation coefficient between yield prediction factor $X_5$ and the yield; and (f) shows a correlation coefficient between yield prediction factor $X_6$ and the yield. In this example, feature bands corresponding to the yield prediction factors $X_1$, $X_3$, and $X_4$ are 838 nm and 784 nm; feature bands corresponding to the yield prediction factor $X_2$ are 745 nm and 849 nm, feature bands corresponding to the yield prediction factor $X_6$ are 679 nm and 718 nm, and feature bands corresponding to the yield prediction factor $X_5$ are 849 nm and 679 nm.

Figure 7:
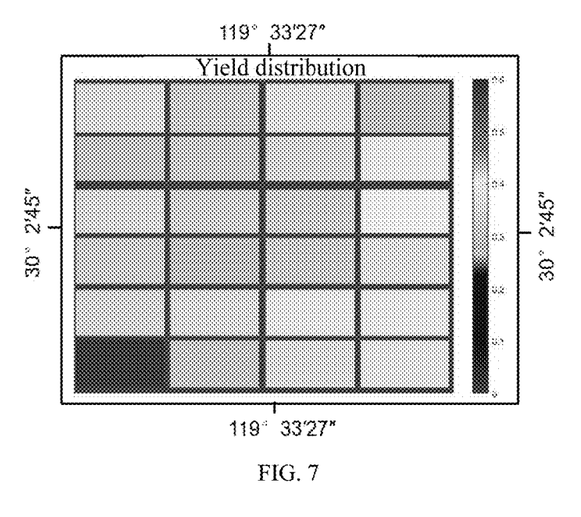
FIG. 7 is a diagram of predicted yield distribution according to a specific example of the present invention.

Finally, a predicted crop yield value of the target area for crop yield prediction is obtained based on a unit yield prediction model containing the yield prediction factors and the crop planting area of the target area for crop yield prediction. FIG. 7 shows distributed yield prediction according to a specific example of the present invention. The yield prediction coefficients α, β, γ, δ, ε, and θ in the unit yield prediction model in this example can be obtained by substituting known crop yields of fields and corresponding yield prediction factors into the unit yield prediction model of the present invention.

Each example of the present specification is described in a progressive manner, each example focuses on the difference from other examples, and the same and similar parts between the examples may refer to each other. For a system disclosed in the examples, since it corresponds to the method disclosed in the examples, the description is relatively simple, and reference can be made to the method description.

In this invention, several examples are used for illustration of the principles and implementations of the present invention. The description of the foregoing examples is used to help illustrate the method of the present invention and the

TABLE 1

| Correlation between bands and yields | | | | | | | | | |
| --- | --- | --- | --- | --- | --- | --- | --- | --- | --- |
| Band | 603 nm | 611 nm | 624 nm | 632 nm | 641 nm | 649 nm | 657 nm | 666 nm | 674 nm |
| Coefficient | 0.175 | −0.429** | −0.265* | −0.399** | −0.413** | −0.267* | −0.567** | −0.488** | −0.317** |
| Band | 679 nm | 693 nm | 718 nm | 732 nm | 745 nm | 758 nm | 771 nm | 784 nm | 796 nm |
| Coefficient | 0.230* | 0.250* | 0.442** | 0.559** | 0.558** | 0.610** | 0.589** | 0.610** | 0.646** |
| Band | 808 nm | 827 nm | 838 nm | 849 nm | 859 nm | 868 nm | 870 nm | | |
| Coefficient | 0.643** | 0.581** | 0.605** | 0.647** | 0.583** | 0.509** | 0.534** | | |

In this example, 24 highly correlated bands in the range of 611 nm to 870 nm are selected as feature bands.

During construction of the yield prediction factors, because the 24 band spectral values in the range of 611 nm to 870 nm can be used for a first feature band and a second feature band corresponding to each yield prediction factor, core principles thereof. In addition, those of ordinary skill in the art can make various modifications in terms of specific implementations and scope of application in accordance with the teachings of the present invention. In conclusion, the content of the present specification shall not be construed as a limitation to the present invention.

What is claimed is:

1. A crop yield prediction method based on low-altitude remote sensing information from an unmanned aerial vehicle (UAV), comprising:
    obtaining a plurality of images taken by a UAV, wherein the UAV uses a multi-spectral camera to shoot crop canopies to obtain reflection spectrum images of a plurality of different bands;
    stitching the plurality of images to obtain a stitched image, wherein the stitched image comprises a plurality of spectral calibration plates;
    performing spectral calibration on the stitched image based on a calibration coefficient of a spectral calibration plate to obtain reflectivity of each pixel in the stitched image;
    using a threshold segmentation method to segment the stitched image based on the reflectivity of each pixel, to obtain a target area for crop yield prediction;
    using a Pearson correlation analysis method to analyze a correlation between reflectivity of each band and a growth status and yield of the crop to obtain feature bands, wherein the feature bands are a plurality of bands with the highest correlation;
    constructing yield prediction factors based on the feature bands; and
    determining a predicted crop yield value of the target area for crop yield prediction based on the yield prediction factors and a crop planting area of the target area for crop yield prediction.

2. The crop yield prediction method based on low-altitude remote sensing information from a UAV according to claim 1, wherein the stitching the plurality of images to obtain a stitched image comprises:
    obtaining a forward overlap rate and a side overlap rate of the images taken by the UAV, wherein the forward overlap rate is an overlap rate of two adjacent aerial images taken by the UAV on a same flight strip; and the side overlap rate is an overlap rate of shooting ranges on two adjacent flight strips of the UAV; and
    performing image stitching on all images based on the forward overlap rate and the side overlap rate, and performing orthophoto correction to obtain the stitched image.

3. The crop yield prediction method based on low-altitude remote sensing information from a UAV according to claim 1, wherein the performing spectral calibration on the stitched image based on a calibration coefficient of the spectral calibration plate to obtain the reflectivity of each pixel in the stitched image comprises:
    obtaining the reflectivity of each spectral calibration plate to obtain a calibration coefficient of each spectral calibration plate;
    performing function fitting based on a coordinate point corresponding to each spectral calibration plate to obtain a reflectivity correction function, wherein an x-coordinate of the coordinate point corresponding to the spectral calibration plate is an average spectral value of all pixels in the spectral calibration plate, a y-coordinate of the coordinate point corresponding to the spectral correction plate is a calibration coefficient of the spectral calibration plate, and the reflectivity correction function is $R=k*DN+b$, wherein R is the reflectivity of a pixel, DN is a spectral value of the pixel, and k and b are coefficients in the reflectivity correction function; and
    obtaining the reflectivity of each pixel in the stitched image based on the spectral value of each pixel in the stitched image by using the reflectivity correction function;
wherein the constructing yield prediction factors based on the feature bands comprises:
obtaining a yield prediction factor model, wherein the yield prediction factor model is:

$$X_1 = (B_{11} + B_{12}) - 1$$

$$X_2 = (B_{21} - B_{22})$$

$$X_3 = (B_{31} - B_{32})/(B_{31} + B_{32})$$

$$X_4 = (B_{41}/B_{42})$$

$$X_5 = 1.5 * \frac{B_{51} - B_{52}}{B_{51} + B_{52} + 0.5}$$

$$X_6 = \frac{1.16*(B_{61} - B_{62})}{B_{61} + B_{62} + 0.16}$$

wherein $X_1$ is a first yield prediction factor model, $B_{11}$ is a spectral value of a first feature band in a first yield prediction factor, and $B_{12}$ is a spectral value of a second feature band in the first yield prediction factor; $X_2$ is a second yield prediction factor model, $B_{21}$ is a spectral value of a first feature band in a second yield prediction factor, and $B_{22}$ is a spectral value of a second feature band in the second yield prediction factor; $X_3$ is a third yield prediction factor model, $B_{31}$ is a spectral value of a first feature band in a third yield prediction factor, and $B_{32}$ is a spectral value of a second feature band in the third yield prediction factor; $X_4$ is a fourth yield prediction factor model, $B_{41}$ is a spectral value of a first feature band in a fourth yield prediction factor, and $B_{42}$ is a spectral value of a second feature band in the fourth yield prediction factor; $X_5$ is a fifth yield prediction factor model, $B_{51}$ is a spectral value of a first feature band in a fifth yield prediction factor, and $B_{52}$ is a spectral value of a second feature band in the fifth yield prediction factor; and $X_6$ is a sixth yield prediction factor model, $B_{61}$ is a spectral value of a first feature band in a sixth yield prediction factor, and $B_{62}$ is a spectral value of a second feature band in the sixth yield prediction factor;

determining all band combinations, wherein the band combination is a combination of any two of all feature bands; and using a sensitivity analysis method to determine the yield prediction factors, wherein the yield prediction factors comprise the first yield prediction factor, the second yield prediction factor, the third yield prediction factor, the fourth yield prediction factor, the fifth yield prediction factor, and the sixth yield prediction factor; a band combination in the first yield prediction factor makes a first correlation coefficient the highest, and the first correlation coefficient is a correlation coefficient between the first yield prediction factor and crop yield; a band combination in the second yield prediction factor makes a second correlation coefficient the highest, and the second correlation coefficient is a correlation coefficient between the second yield prediction factor and crop yield; a band combination in the third yield prediction factor makes a third correlation coefficient the highest, and the third correlation coefficient is a correlation coefficient between the third yield prediction factor and crop yield; a band combination in the fourth yield prediction factor makes a fourth correlation coefficient the highest, and the fourth correlation coefficient is a correlation coefficient between the fourth yield prediction factor and crop yield; a band combination in the fifth yield prediction factor makes a fifth correlation coefficient the highest, and the fifth correlation coefficient is a correlation coefficient between the fifth yield prediction factor and crop yield; and a band combination in the sixth yield prediction factor makes a sixth correlation coefficient the highest, and the sixth correlation coefficient is a correlation coefficient between the sixth yield prediction factor and crop yield.

4. The crop yield prediction method based on low-altitude remote sensing information from a UAV according to claim 3, wherein the determining a predicted crop yield value of the target area for crop yield prediction based on the yield prediction factors and a crop planting area of the target area for crop yield prediction comprises:

obtaining a unit yield prediction model, wherein the unit yield prediction model is:

$$M=\alpha*X_1+\beta*X_2+\gamma*X_3+\delta*X_4+\varepsilon*X_5+\theta*X_6$$

wherein $\alpha$, $\beta$, $\gamma$, $\delta$, $\varepsilon$, and $\theta$ are yield prediction coefficients, and M is a predicted value of unit yield; and determining the predicted crop yield value of the target area for crop yield prediction based on the unit yield prediction model and the crop planting area of the target area for crop yield prediction by using a formula F=M*N, wherein N is the crop planting area of the target area for crop yield prediction, and F is the predicted crop yield value in the target area for crop yield prediction.

5. A crop yield prediction system based on low-altitude remote sensing information from an unmanned aerial vehicle (UAV), comprising a processor and a memory storing program codes, wherein the processor performs the stored program codes for:

obtaining a plurality of images taken by the UAV, wherein the UAV uses a multi-spectral camera to shoot crop canopies to obtain reflection spectrum images of a plurality of different bands;

stitching the plurality of images to obtain a stitched image, wherein the stitched image comprises a plurality of spectral calibration plates;

performing spectral calibration on the stitched image based on a calibration coefficient of a spectral calibration plate to obtain reflectivity of each pixel in the stitched image;

using a threshold segmentation method to segment the stitched image based on the reflectivity of each pixel, to obtain a target area for crop yield prediction;

using a Pearson correlation analysis method to analyze a correlation between reflectivity of each band and a growth status and yield of the crop to obtain feature bands, wherein the feature bands are a plurality of bands with the highest correlation;

constructing yield prediction factors based on the feature bands; and determining a predicted crop yield value of the target area for crop yield prediction based on the yield prediction factors and a crop planting area of the target area for crop yield prediction.

6. The crop yield prediction system based on low-altitude remote sensing information from a UAV according to claim 5, wherein the stitching the plurality of images to obtain a stitched image comprises:

obtaining a forward overlap rate and a side overlap rate of the images taken by the UAV, wherein the forward overlap rate is an overlap rate of two adjacent aerial images taken by the UAV on a same flight strip; and the side overlap rate is an overlap rate of shooting ranges on two adjacent flight strips of the UAV; and performing image stitching on all images based on the forward overlap rate and the side overlap rate, and perform orthophoto correction to obtain the stitched image.

7. The crop yield prediction system based on low-altitude remote sensing information from a UAV according to claim 5, wherein the performing spectral calibration on the stitched image based on a calibration coefficient of the spectral calibration plate to obtain the reflectivity of each pixel in the stitched image comprises:

obtaining the reflectivity of each spectral calibration plate, to obtain a calibration coefficient of each spectral calibration plate;

performing function fitting based on a coordinate point corresponding to each spectral calibration plate to obtain a reflectivity correction function, wherein an x-coordinate of the coordinate point corresponding to the spectral calibration plate is an average spectral value of all pixels in the spectral calibration plate, a y-coordinate of the coordinate point corresponding to the spectral correction plate is a calibration coefficient of the spectral calibration plate, and the reflectivity correction function is R=k*DN+b, wherein R is the reflectivity of a pixel, DN is a spectral value of the pixel, and k and b are coefficients in the reflectivity correction function; and obtaining the reflectivity of each pixel in the stitched image based on the spectral value of each pixel in the stitched image by using the reflectivity correction function.

8. The crop yield prediction system based on low-altitude remote sensing information from a UAV according to claim 5, wherein the constructing yield prediction factors based on the feature bands comprises:

obtaining a yield prediction factor model, wherein the yield prediction factor model is:

$$X_1 = (B_{11} + B_{12}) - 1$$

$$X_2 = (B_{21} - B_{22})$$

$$X_3 = (B_{31} - B_{32})/(B_{31} + B_{32})$$

$$X_4 = (B_{41}/B_{42})$$

$$X_5 = 1.5 * \frac{B_{51} - B_{52}}{B_{51} + B_{52} + 0.5}$$

$$X_6 = \frac{1.16 * (B_{61} - B_{62})}{B_{61} + B_{62} + 0.16}$$

wherein $X_1$ is a first yield prediction factor model, $B_{11}$ is a spectral value of a first feature band in a first yield prediction factor, and $B_{12}$ is a spectral value of a second feature band in the first yield prediction factor; $X_2$ is a second yield prediction factor model, $B_{21}$ is a spectral value of a first feature band in a second yield prediction factor, and $B_{22}$ is a spectral value of a second feature band in the second yield prediction factor; $X_3$ is a third yield prediction factor model, $B_{31}$ is a spectral value of a first feature band in a third yield prediction factor, and $B_{32}$ is a spectral value of a second feature band in the third yield prediction factor; $X_4$ is a fourth yield prediction factor model, $B_{41}$ is a spectral value of a first feature band in a fourth yield prediction factor, and $B_{42}$ is a spectral value of a second feature band in the fourth yield prediction factor; $X_5$ is a fifth yield prediction factor model, $B_{51}$ is a spectral value of a first feature band in a fifth yield prediction factor, and $B_{52}$ is a spectral value of a second feature band in the fifth yield prediction factor; and $X_6$ is a sixth yield prediction factor model, $B_{61}$ is a spectral value of a first feature band in a sixth yield prediction factor, and $B_{62}$ is a spectral value of a second feature band in the sixth yield prediction factor;

determining all band combinations, wherein the band combination is a combination of any two of all feature bands; and using a sensitivity analysis method to determine the yield prediction factors, wherein the yield prediction factors comprise the first yield prediction factor, the second yield prediction factor, the third yield prediction factor, the fourth yield prediction factor, the fifth yield prediction factor, and the sixth yield prediction factor; a band combination in the first yield prediction factor makes a first correlation coefficient the highest, and the first correlation coefficient is a correlation coefficient between the first yield prediction factor and crop yield; a band combination in the second yield prediction factor makes a second correlation coefficient the highest, and the second correlation coefficient is a correlation coefficient between the second yield prediction factor and crop yield; a band combination in the third yield prediction factor makes a third correlation coefficient the highest, and the third correlation coefficient is a correlation coefficient between the third yield prediction factor and crop yield; a band combination in the fourth yield prediction factor makes a fourth correlation coefficient the highest, and the fourth correlation coefficient is a correlation coefficient between the fourth yield prediction factor and crop yield; a band combination in the fifth yield prediction factor makes a fifth correlation coefficient the highest, and the fifth correlation coefficient is a correlation coefficient between the fifth yield prediction factor and crop yield; and a band combination in the sixth yield prediction factor makes a sixth correlation coefficient the highest, and the sixth correlation coefficient is a correlation coefficient between the sixth yield prediction factor and crop yield.

9. The crop yield prediction system based on low-altitude remote sensing information from a UAV according to claim 8, wherein the determining a predicted crop yield value of the target area for crop yield prediction based on the yield prediction factors and a crop planting area of the target area for crop yield prediction comprises:

obtaining a unit yield prediction model, wherein the unit yield prediction model is:

$$M=\alpha^*X_1+\beta^*X_2+\gamma^*X_3+\delta^*X_4+\varepsilon^*X_5+\theta^*X_6$$

wherein $\alpha$, $\beta$, $\gamma$, $\delta$, $\varepsilon$, and $\theta$ are yield prediction coefficients, and M is a predicted value of unit yield; and determining the predicted crop yield value of the target area for crop yield prediction based on the unit yield prediction model and the crop planting area of the target area for crop yield prediction by using a formula F=M*N, wherein N is the crop planting area of the target area for crop yield prediction, and F is the predicted crop yield value in the target area for crop yield prediction.

* * * * *